United States Patent [19]

Yeagley

[11] Patent Number: 4,663,045

[45] Date of Patent: * May 5, 1987

[54] ORGANIC WASTE BIOCONVERTING METHOD

[76] Inventor: Henry L. Yeagley, 133 Wilson St., Carlisle, Pa. 17013

[*] Notice: The portion of the term of this patent subsequent to Apr. 21, 1998 has been disclaimed.

[21] Appl. No.: 674,818

[22] Filed: Nov. 26, 1984

Related U.S. Application Data

[60] Division of Ser. No. 509,506, Jun. 30, 1983, Pat. No. 4,499,614, which is a continuation-in-part of Ser. No. 940,233, Sep. 7, 1978, abandoned.

[51] Int. Cl.⁴ .............................................. C02F 3/02
[52] U.S. Cl. ................................. 210/612; 210/614; 4/DIG. 12
[58] Field of Search ............. 210/612, 614, 629, 96.1, 210/219; 4/111.2, 111.3, 111.6, DIG. 12

[56] References Cited

U.S. PATENT DOCUMENTS

| | | | |
|---|---|---|---|
| 3,666,103 | 5/1972 | Green | 210/612 X |
| 3,745,113 | 7/1973 | Fuchs | 210/612 X |
| 3,859,672 | 1/1975 | Modig | 4/111 |
| 3,865,721 | 2/1975 | Kaelin | 210/612 X |
| 3,959,829 | 1/1976 | Nordgren | 4/131 |
| 4,009,100 | 2/1977 | Hess et al. | 210/612 |
| 4,096,592 | 6/1978 | Clark | 4/DIG. 12 |
| 4,174,371 | 11/1979 | Bell et al. | 4/DIG. 12 |
| 4,263,135 | 4/1981 | Yeagley | 210/612 |

Primary Examiner—Tom Wyse
Attorney, Agent, or Firm—Sughrue, Miion, Zinn, Macpeak, and Seas

[57] ABSTRACT

The bioconverter includes a collecting vessel having a plurality of stirring shafts rotatably mounted therein, each of which is driven by a separate electric motor. Adjacent shafts operate in opposite directions and stirring arms are oriented relative to each shaft moving the carrier mixture within the vessel which is in close proximity to a shaft in opposite directions along adjacent shafts. A moisture sensing device is adapted to be located below the level of the carrier mixture within the vessel for sensing the percentage moisture content of the mixture and waste material added thereto. A first fan is provided for exhausting the air from the vessel and a second fan is provided for moving the air over the surface of the mixture within the vessel. A first heating coil is located on the bottom of the vessel for heating the mixture within the vessel, and a second heating coil is provided adjacent the second fan for heating the air which is blown over the upper surface of the mixture within the vessel. A lid responsive switch is provided for controlling the fan, the motors for driving the stirring shafts and at least the first heating coil. If too much moisture is present, the moisture sensing device energizes the second heating coil and if the percentage moisture content drops to a very low value, the mixing motors, the fan, and the heating coils will be shut-off.

5 Claims, 9 Drawing Figures

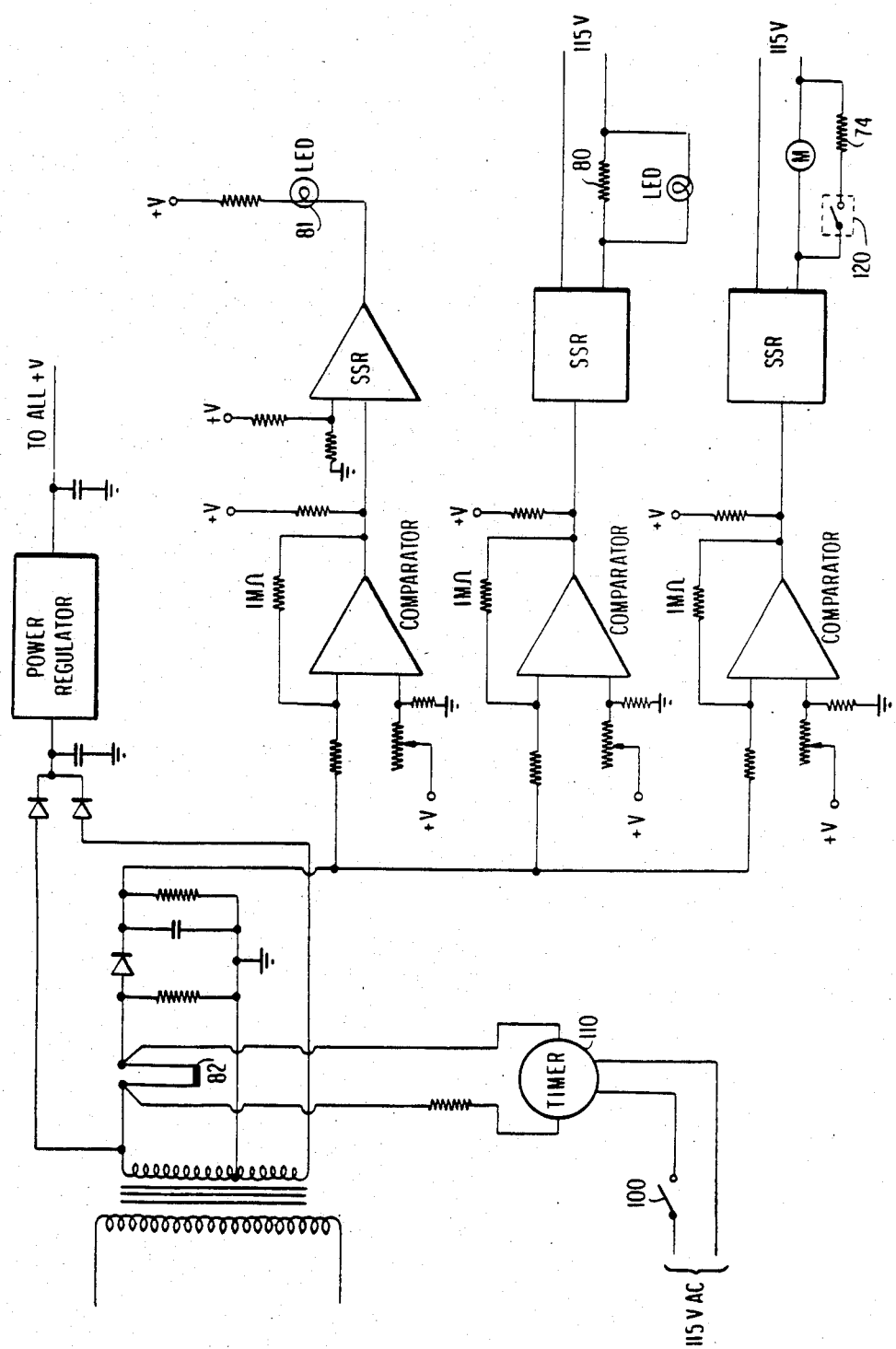

ORGANIC WASTE BIOCONVERTING METHOD

CROSS REFERENCE TO RELATED APPLICATION

The present application is a division of application Ser. No. 509,506, filed June 30, 1983, now U.S. Pat. No. 4,499,614, which in turn is a continuation-in-part of application Ser. No. 940,233, filed Sept. 7, 1978, "Continuous Agitation Rapid Oxidation Biodegrader and Method", now abandoned.

BACKGROUND OF THE INVENTION

The present invention is directed to an organic waste bioconverter and a method for converting human and food wastes substantially into carbon dioxide and water. More specifically, the present invention is directed to a dry closet having means for mixing the organic waste with a porous carrier in a collecting vessel under the control of a moisture sensing device.

Periodically, various parts of our country suffer from a critical shortage of water, a natural resource which many of us take for granted. Such water shortages opened many eyes to the fact that, if our population continues to grow at its present rate, in the not too far distant future, there may not be enough clean water to meet our daily needs. One way in which an individual's daily water requirement can be drastically reduced is to replace the conventional, popular flush toilet with a dry toilet. Indeed, the flush toilet is the third most serious polluter and destroyer of our world's environment. Its menace is exceeded only by the pesticides of agriculture and the poisons of industry. While to many the use of a dry toilet sounds like a step backwards in time to the old fashioned outhouse, it does not by any means have to be so distasteful or inconvenient.

The Modig U.S. Pat. No. 3,859,672, discloses a dry closet of the same general type as the present invention. The Modig closet comprises a collecting vessel having at least a partially perforated bottom. The vessel contains a bed of material suitable for biologically decomposing the waste material introduced into the vessel. A shaft having suitable mixing blades thereon is located within the vessel for mixing the waste with the carrier material, either intermittently or continuously when the closet is in use. A heat generating device is also provided within the dry closet outside of the collecting vessel for use under certain climatic conditions.

The Nordgren U.S. Pat. No. 3,959,829, is directed to a dry closet similar to the Modig closet described above. Nordgren further provides a plurality of electric heating foils arranged beneath the collecting vessel to provide uniform heat to the vessel. A thermostat is provided for controlling one or more of the heating coils to provide additional heat if the temperature within the vessel decreases due to excess moisture. A moisture responsive switch is also provided in the bottom of the vessel for controlling a fan in the upper portion of the vessel. Manually operated stirring means are provided in the vessel for mixing the waste material with the carrier material.

Moisture sensing devices of the type having a pair of spaced apart contacts embedded in the soil are old and well known in the art as evidenced by the Haagen U.S. Pat. No. 4,122,389, and Phillips U.S. Pat. No. 4,268,824.

SUMMARY OF THE INVENTION

The present invention is directed to an improved dry closet which is so efficient in aerobic decomposition that it can be used in an indoor bathroom (or for that matter, in any room in the house, independent of conventional plumbing), without the accompanient of unpleasant odors, and can be used for months without removing matter from the collecting vessel.

The present invention is also directed to a new and improved efficient method for bioconverting waste wherein the wastes are continuously agitated and supplied with oxygen and appropriate heat from the time they are introduced into the closet and for the duration of the bioconversion reaction.

The present invention is directed to a new and improved organic waste bioconverter comprising a housing, a collecting vessel disposed within the housing, first heating means operably associated with said collecting vessel, stirring means mounted for rotation within the collecting vessel for stirring a mixture of waste material and carrier material introduced therein, electric motor means for driving said stirring means, fan means mounted in said housing about said collecting vessel, secondary heater means mounted adjacent said fan means, and electrical control circuit means for said electric motor means, said fan means, and said first and second heating means including moisture sensing means and thermostat means.

The present invention provides a new and improved moisture sensing means adapted to be mounted within the bottom of a collecting vessel in intimate contact with the mixture therein for sensing the percentage moisture content of the mixture comprising a pair of electrically conductive plates separated by electrical insulating means having an exposed recess at one end thereof filled with a porous solid material, such as plaster of paris. Lead wires are secured to each of the electrically conductive plates and the entire assembly is secured together by electrically insulating tape leaving the porous solid material exposed at one end.

The foregoing and other objects, features and advantages of the invention will be apparent from the following more particular description of the preferred embodiments of the invention as illustrated in the accompanying drawings.

BRIEF DESCRIPTION OF THE DRAWINGS

FIG. 7 is a circuit diagram according to a first embodiment of the present invention.

DETAILED DESCRIPTION OF THE INVENTION

A most basic and fundamental requirement for successful operation of a bioconverter, especially a bioconverter used in the home, is an ever-abundant supply of oxygen to the wastes at the optimum temperature and time for aerobic decomposition. To the extent this condition is fulfilled, the conversion reaction is more rapid and unpleasant odors are eliminated. When an abundant supply of oxygen is available to the wastes, contact between molecules of wastes, oxygen and aerobic bacteria is maximized, and the chief decomposition products of the process are odorless carbon dioxide and water. On the other hand, if this condition is not fulfilled, anaerobic decomposition and unpleasant odors occur.

Typically, liquid (urine), solid and food wastes will be introduced to the bioconverter at one time. This, however, makes rapid bioconversion difficult because good contact between air (oxygen), wastes and bacteria is not possible when the mix is too wet. The precentage of moisture in the bioconversion mix should be 40-60 percent for optimum speed of reaction. If too much water is present in the wastes, the excess water interferes with the contact between wastes, oxygen and bacteria, but adequate water must be present for the bacteria to function.

In accordance with the present invention, contact between air and wastes is maximized by continuously and thoroughly agitating the wastes and dispersing medium and supplying air (oxygen) to them from the time the wastes are deposited in the collecting vessel to the time the decomposition reaction is completed. Using this technique, the waste mixture has an opportunity to reduce the moisture content (i.e., to a 40-60 percent water content level) and oxygen is still being supplied to wastes at the optimum moisture level for bioconversion. In contrast to conventional techniques where the wastes are agitated only temporarily and oxygen is inadequately supplied and the water content of the wastes is not optimal for bioconversion, in the present invention, by continuing to agitate and supply oxygen to the wastes long after their introduction to the collecting vessel, a plentiful supply of oxygen is available at the most opportune time for bioconversion.

Figure 1:
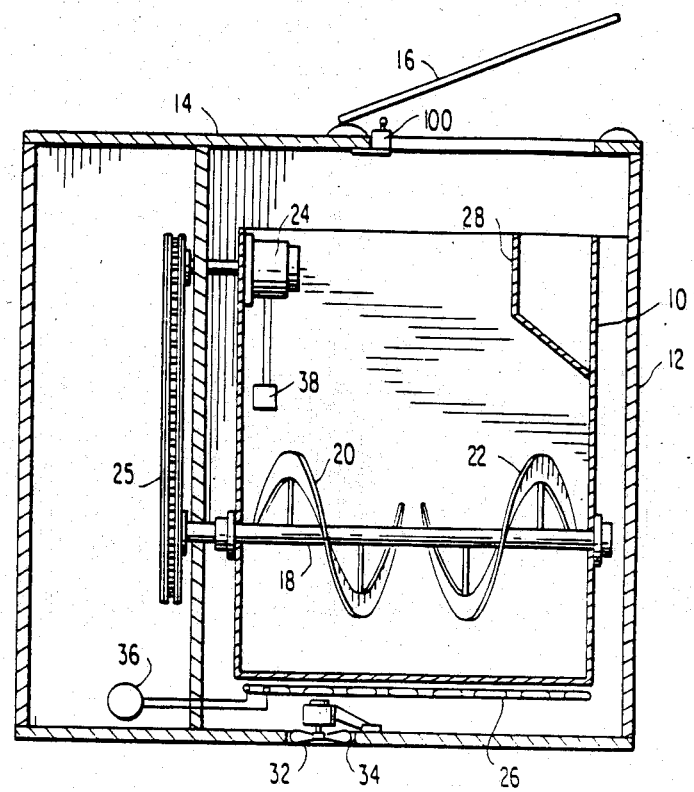
FIG. 1 is a side elevation view, partly in section, of the dry closet according to a first embodiment of the present invention.

In the drawings, like parts are identified by the same reference numeral. A home unit is shown in FIG. 1, where the collecting vessel is approximately U-shaped and designated 10. The collecting vessel may be formed of any suitable non-corrosive, easily cleaned material. Stainless-steel is preferred. The size of the vessel should be adjusted for the number of people using the dry closet. A two-person unit has dimensions approximately 18" long, 20" wide and 18" deep, with two radii of the curved bottom being 5". The vessel is housed in a cabinet 12 having an upper surface 14 with an elevatable lid 16. The cabinet may be constructed of any material; aesthetically, a material is selected which gives the unit an attractive appearance.

Not shown in FIG. 1 for the convenience of the illustration is the bed of dispersing medium. The dispersing medium may be any material suitable for supporting aerobic decomposition. Such media are well known in the art. Their basic function is to act as a carrier for the wastes, whereby the wastes are evenly distributed and intimately contacted with the oxygen in the air as they are stirred and mixed. Peat moss is a preferred medium, but the medium may not need to be biologically decomposable itself.

Figure 2:
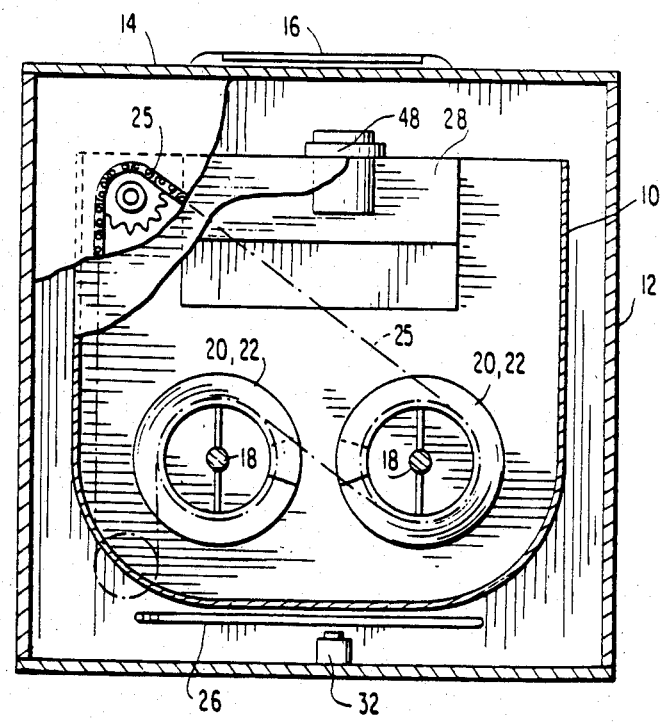
FIG. 2 is a front view, partly in section, of the the dry closet shown in FIG. 1.

In the embodiment shown in FIG. 1, the rotational and translational mixing is accomplished by two pairs of parallel opposing augers. Horizontal shafts 18 are rotationally journaled to the side walls of the collecting vessel 10 and each carries two augers 20 and 22. The auger-type stirrers are arranged to oppose one another such that when rotated in the same direction on the shaft, they move the bioconverting matter from the left and right walls of the collecting vessel in FIG. 1 to the center. The horizontal shafts are powered by electric motor 24 via a chain drive 25 and rotate in opposite directions such that the mix is moved upward between them as shown in FIG. 2. Naturally, any means can be used to transmit power from the motor to the horizontal shafts, and a chain drive is shown merely for purposes of illustration. The motors operate at about 5 r.p.m., and the augers rotate at about 2 r.p.m.

Oxygen from the atmosphere is supplied to the collecting vessel by means of circulating fan 32 located in vent 34. As the fan rotates, a continual supply of oxygen is furnished as the air and decomposition products are drawn from the collecting vessel. The exhaust air and decomposition products are conveniently conducted to the outdoors by means of a vent pipe. In the case of a modern bathroom installation, removal of the flush toilet leaves an open four inch soil pipe flush with the floor which forms a natural air vent to the roof. Thus, to substitute the bioconverter for the flush toilet, it is only necessary to position the vent and circulating fan with respect to the soil pipe. In a bedroom installation or an installation where a soil pipe is unavailable, a short four inch flexible plastic tube will serve to carry the exhaust vapors through a window arrangement or through a side wall of the house.

Unlike biodegraders presently on the market, it is recommended that the present bioconverter operate at a uniform temperature of about 90° F. throughout its entire mixing mass. This is maintained exothermally when wastes of sufficient amount are still present, otherwise the temperature is maintained by electrical energy until new wastes are introduced. Conventionally, the mass is heated with a heat generating means, such as a heating coil, tape, or wire, on the underside of the collecting vessel, as shown at 26. By mounting the motor within the collecting vessel, the heating requirement from these conventional means may be reduced by the amount of heat generated by the motor inside of the vessel. This process is found to eliminate pathogens by bacterial action at the operating 90° F. temperature rather than at an elevated temperature as in conventional systems now on the market. While a temperature of 90° F. is recommended, slightly higher or lower temperatures can be used without departing from the teachings herein. In order that the decomposition reaction takes place, the art has found it necessary to elevate the temperature of the mixture in the collecting vessel. By using the present converter it is not necessary to raise the temperature as high as in the prior art, but temperatures of about 90° F. are ideal for conversion and also set-up conditions sufficient to kill the pathogens.

The heating and mixing requirements vary depending on the use the closet receives. When the decomposition reaction is in its most active stage, the heat generated by the exothermic decomposition reaction is sufficient to maintain the temperature requirement. At this stage, it is unnecessary to supply heat to the vessel. On the other hand, when the reaction is less active, the temperature must be maintained for efficient decomposition. To this end, heat generating means 26 is provided with a thermostatic switch 36 which activates the means when the temperature in the vessel is too low and cuts the means out when additional heat is not required. Likewise, the length of time the chemically reactive mass must be mixed and agitated by the mixers varies with the amount of use—longer times being required for more use and shorter times being required for less. While continuous agitation is necessary for a rapid reaction and good oxygen (air)-waste contact, cost and energy considerations as well as undesireable dust production dictate that the device not be run once the decomposition reaction is over. The humidity level in the collecting vessel drops when the decomposition reaction is finished. Based on this observation, the electric motor 24 is equipped with a dehumidistat control 38 which automatically shuts off the motor as well as the electric heater when the reaction is complete and the moisture in the mixture drops below a predetermined level.

Figure 3:
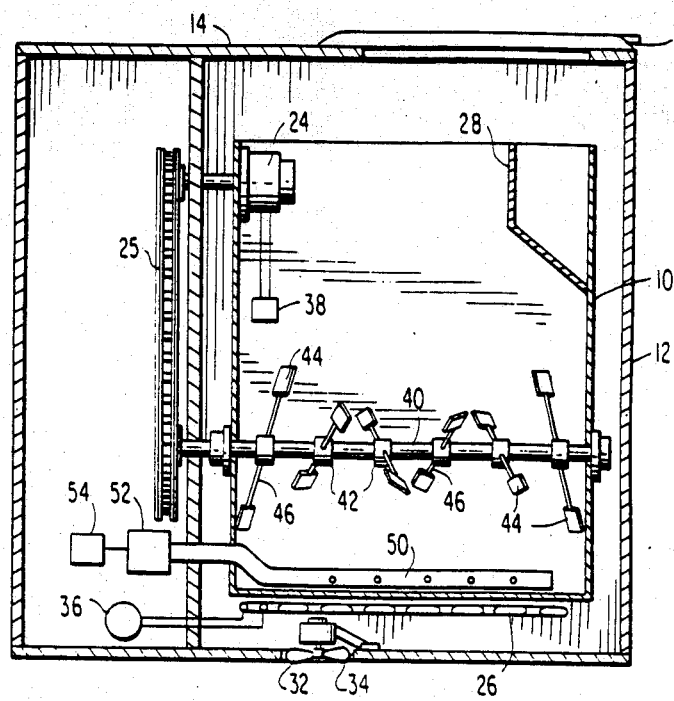
FIG. 3 is a side elevation view, partly in section, of a second embodiment of the present invention.

FIG. 3 illustrates another stirrer which can be used in the present invention. This stirrer furnishes an auger-type mixing, i.e., a translational as well as a rotational mix of the matter within the collecting vessel and comprises a series of arms 46 equipped with paddles 44 journaled at 42 onto a horizontal shaft 40. As opposed to being perpendicular to the shaft as in U.S. Pat. No. 3,859,672, the arms 46 are journaled to the shaft 40 at an angle (in FIG. 3- about 15°-20° off of perpendicular) such that rotation of the shaft results in a rotational mix and translational movement of the matter to the center of the collecting vessel. The paddles sit on the arms at an angle to one another so that when viewed down the axis of the arms, the paddles cross. This assists in the translational movement of the matter.

Collecting vessel 10 includes a urinal chute 28. As pointed out above, rapid oxidation cannot take place if the composting mass is too wet. Thus, the liquid, such as urine, is either allowed to enter the mixing mass at a slow rate or evaporated by a separate heating coil in order to better control the percentage moisture in the decomposing mixture.

A main objective of the home unit bioconverter is to eliminate wastes without polluting the environment and, at the same time, conserve water and energy. In addition to body waste, an adult person generates large amounts of food and other organic wastes. These wastes can also be disposed of in the bioconverter. However, experience has shown that food wastes, such as grapefruit rinds and the like, must be shredded to be efficiently disposed of in this system. Thus, in the exemplary embodiment, a food shredder 48 is shown as an integral part of the unit.

Further, as pointed out above, an abundant supply of oxygen from the air is a fundamental requirement for efficient operation of the present system. An aerator, such as a perforated pipe 50, may be located at the bottom of the collecting vessel. Such an aerator would be connected to a compressed airpump 52 driven by a motor 54 such that upon using the biodegrader, air would be pumped directly into the composting mass to thereby further improve oxygen contact achieved by thoroughly stirring and mixing the composting mass with the mixers.

Finally, the heat carried from the collecting vessel in the decomposition gases and evaporated water can be conserved by incorporating a vapor condensing system (not shown) in with the vent system Food or human wastes may be put into the bioconverter in combination or separately. All of the bacteria required for the biological reactions are present in the wastes and/or the medium and they proceed to react under all moisture conditions as discussed above. No special or additional bacterial cultures are required.

Figure 4:
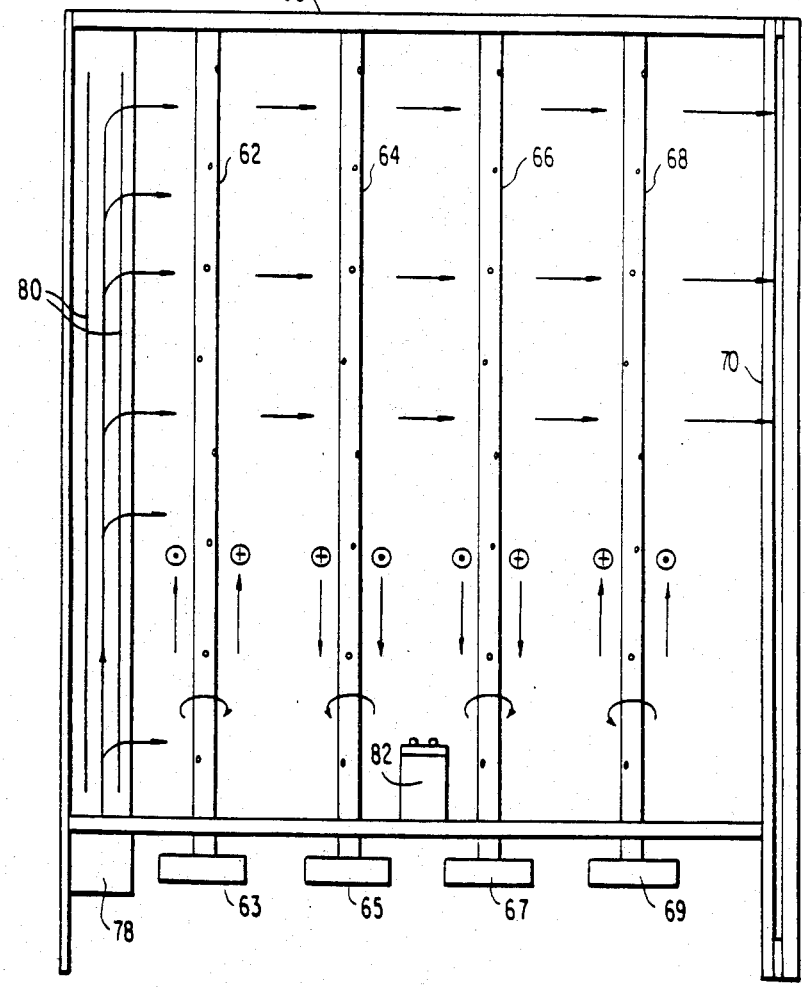
FIG. 4 is a schematic top plan view of a third embodiment of the dry closet according to the present invention.

In the embodiment of FIG. 4 the collecting vessel 60 is provided with four parallel shafts 62, 64, 66, and 68, which are driven by 1 RPM shaded pole gear motors 63, 65, 67 and 69, respectively. The collecting vessel 60 is provided with an inner casing 70 which is spaced from the side wall of the main collecting vessel and which is provided with one or more openings 72 adapted to be located above the upper surface of the carrier mix. Primary heater coils 74 are mounted in close proximity to the bottom surface of the inner casing 70 to provide the primary source of heat for the carrier mix. A primary fanmotor assembly 76, is mounted in the bottom of the outer casing 60 adjacent an aperture which is adapted to lead to a vent pipe for exhausting the air from the collecting vessel. A secondary fan-motor assembly 78 is mounted in the collecting vessel above the upper surface of the carrier mix for moving a supply of air over the upper surface of the mix to the apertures 72 whereupon the air will move between the inner casing and outer casing and be drawn downwardly and outwardly by the primary fan-motor 76. Secondary heater coils 80 are located within the housing of the fan-motor assembly 78 whereby the air passing over the upper surface of the carrier mix may be heated to assist in removing moisture from the carrier mix.

Figure 5:
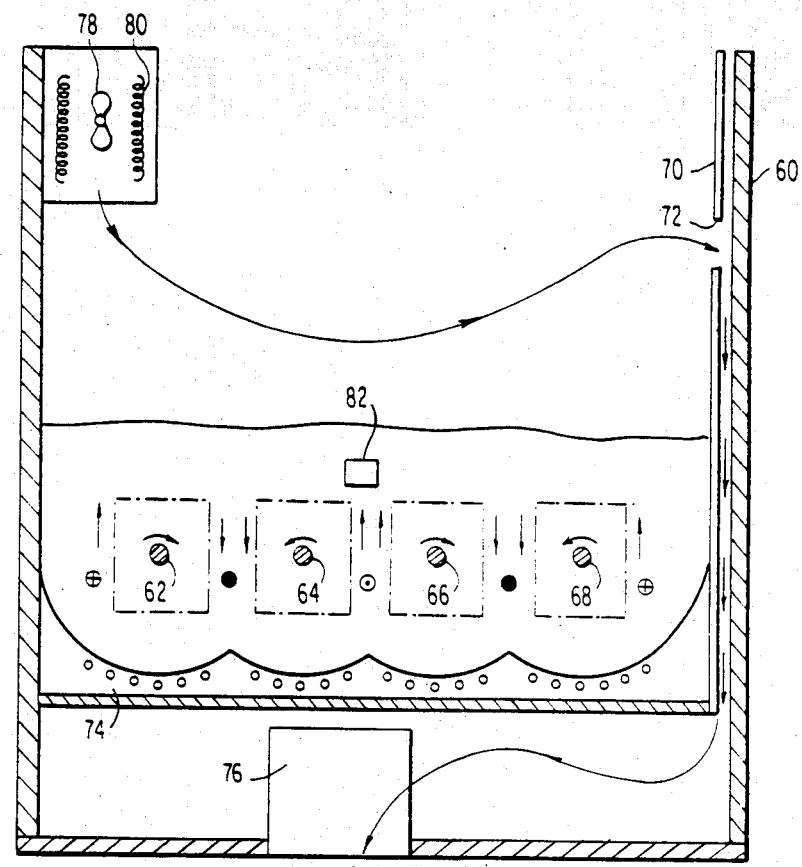
FIG. 5 is a rear view, partly in section, of the dry closet shown in FIG. 4.

The four shafts 62, 64, 66, and 68 mounted within the collecting vessel are rotated in the direction of the curved arrows as best seen in FIG. 5. Each of the shafts has a plurality of stirring members radially extending therefrom so that upon rotation of the shafts, the mix will then have a vertical component of movement as indicated by vertical arrows in FIG. 5. Due to the auger effect of the stirring arm configuration, similar to that illustrated in FIG. 3, the carrier mix can be moved in accordance with the motion indicated by the circles adjacent the shafts. A solid black circle indicates no specific movement of the carrier mix in the forward or rearward direction parallel to the shaft, a circle with a dot indicates movement of the mix in a direction extending outwardly of the paper as viewed in FIG. 5, and a circle with a cross therein indicates a movement of the mix in a direction into the paper as viewed in FIG. 5.

Figure 6A:
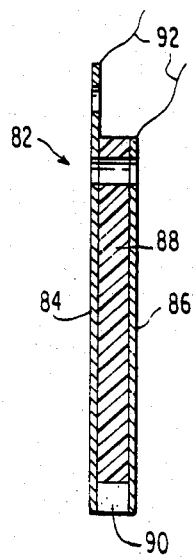
FIG. 6a is a side elevation sectional view of the moisture sensor according to the present invention.
Figure 6B:
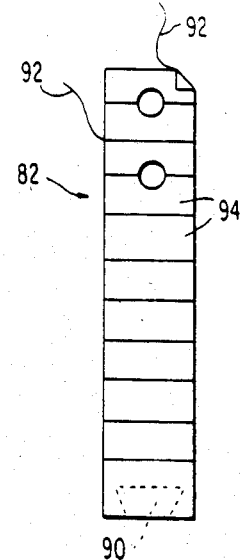
FIG. 6b is a front elevation view of the moisture sensor.
Figure 8:
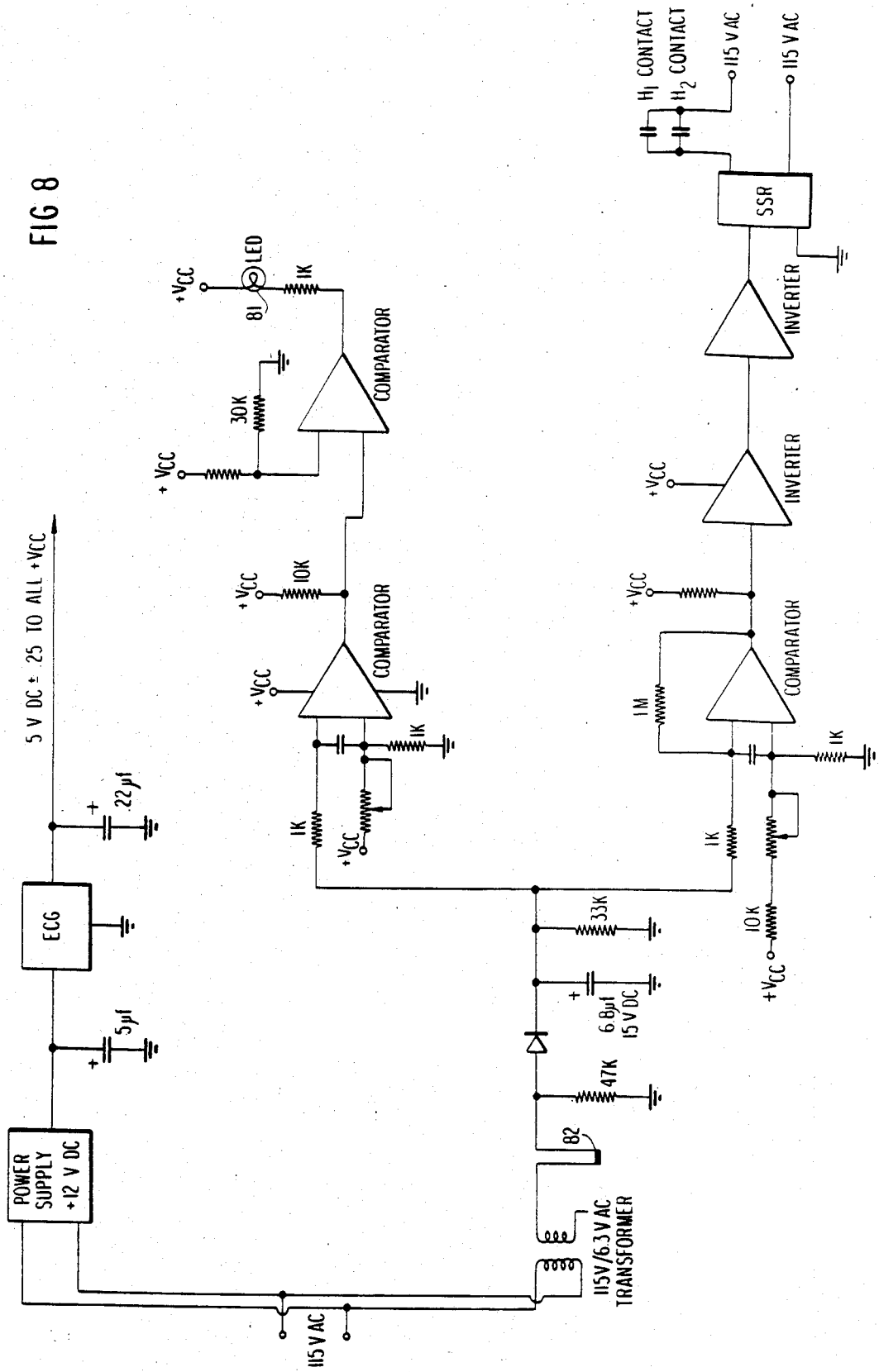
FIG. 8 is a circuit diagram of a second embodiment according to the present invention.

A moisture sensor 82 is mounted within the collecting vessel at a location to ensure that a sensor will always be well below the upper surface of the carrier mix so that the mositure sensor can accurately detect the percentage moisture content of the carrier mix. The moisture sensor 82 is shown in detail in FIGS. 6a and 6b, and is comprised of a pair of stainless steel plates 84 and 86 having a plate 88 of insulating material such as plexiglass or the like sandwiched therebetween. A notch is formed in one end of the plexiglass material and is filled with a porous solid material 90 such as plaster of paris. Copper connecting wires 92 are attached to the upper end of the two metal plates by crimping, soldering or the like and the entire assembly is firmly bound together by multiple bands 94 of insulating filament tape or the like. Suitable apertures may be provided in the assembly for mounting the assembly within the collecting vessel.

According to the aerobic bioconversion process of the present invention for transforming human and food wastes into gasses, it is necessary to mix the solid and liquid portion of the human and food wastes into a particulate medium of a porous substance. The solid portions must be broken up into and dispersed into tiny globules so that their molecular structures are exposed to the greatest possible surface areas in order to make the most homogeneous, intimate and intensive contact between the organic waste molecules, the aerobic bacteria and the oxygen molecules. It is necessary to maintain the mixture at approximately 90° F. which is the temperature at which the bacterial action is most rapid. To maintain the relative humidity of the ambient transport air at a low percentage value so as it passes over the carrier mixture the water vapor from both the urine and converted solid waste will be removed rapidly. The greatest deterrent to a higher person per day capacity of the system is the rate at which the water vapor can be removed. The elimination of the $CO_2$ gas and the small quantity of ammonia vapor is no restriction in this respect. It is necessary to control the overall percentage moisture content of the carrier mixture between 30 PMC and 60 PMC. The percentage moisture content is entirely different from and should not be interpreted as "relative humidity", since the latter expresses a condition existing in a space originally occupied by air. The PMC term refers to the relative amount of water dispersed in a solid-particulate mass. Under these conditions the organic globules themselves are maintained at a percentage moisture content within the required limits of 40 PMC and 60 PMC in which range the aerobic bacteria can function at a high degree of activity.

As pointed out previously, the carrier mixture should contain about fifty percent of an extremely porous particulate material mixed with an equal amount of finely divided non-porous platelet substances. Peat moss is an excellent carrier mixture. Alternatively, finely chopped dry grass can be used for the porous material and finely chopped dry deciduous leaves can be used to supply the dense platelet component. The porous material serves to absorb the oxygen molecules from the transport air and merge them with the organic molecules which are naturally and inherently intermingled with the aerobic bacteria. The stirring and blending arrangement shown in FIGS. 4 and 5 is especially adapted to achieve the greatest mixing rate to achieve optimum results, namely the most rapid and complete mixing of human and food waste particles in order to bring them into intimate contact with oxygen molecules and microscopic aerobic bacteria.

The function of the primary heater 74 is to maintain the temperature of the carrier mixture at 90° F. The heat of the motor is conveyed by the transport air and aids in this function. The primary heater 74 is turned on and off with the motors by the control system described hereinafter and shown in FIGS. 7 and 8. The primary heater 74 can also be controlled by a 90° F. thermostat.

On days when the relative humidity of the transport air is high, the moisture removing power of the air is reduced. It then becomes necessary to heat the air to reduce its relative humidity by heat energy furnished by secondary heater coils 80.

The moisture sensor 82 operates on the principle that the resistivity of a chemically inert and porous substance embedded in the mixture would vary with the equilibrium state of all the molecules and ions penetrating its volume while in surface contact with the mix.

The ideal position for the exposed surface area of the porous material 90 of the moisture sensor is about two inches from the end wall of the collecting vessel. Since the wastes are deposited in the channel between the two shafts where the moisture sensor is located and since the mixture is moving in a direction toward the moisture sensor as best seen in FIG. 4, the resulting molecules and ions will reach the sensor and permit the control device to take over in a matter of about ten minutes. Ordinarily the motors 63, 65, 67, and 69 are activated by a manually controlled switch after waste material has been deposited into the collecting vessel. The motors will initially be under the control of a twenty minute timer switch which will keep the motors activated until the automatic control takes over as a result of the moisture sensor 82 sensing a moisture level in the desired range. Thus, with the moisture level above a predetermined level, the motors will continue to stir the carrier mixture to assist in the conversion of the waste materials.

With respect to the electronics of the control, it has been determined by repeated observation that when the organic particles have a PMC of 40, the sensor or resistance reaches a value of 400,000 Ohms. The overall findings indicate that for optimum results the percentage moisture content of the organic substances being transformed must be between 40 and 60 PMC. Likewise, experience shows that the present detector-sensor 82 varies within limits of 400,000 Ohms before organic wastes are deposited in the fresh carrier mix and decreases to 30,000 Ohms before the conversion process slows to an appreciable degree. When the resistence drops to 25,000 Ohms, the carrier mix is considered to be in the "too moist" range.

The solid state control circuit diagram in FIG. 7 impresses a steady AC voltage across the sensor mass and in combination with the thyristors and solid state rectifiers controls the motors and heaters in the following manner.

At the driest permitted PMC, corresponding to a sensed resistence of 400,000 Ohms, the motor and primary heater circuits are opened. Under these conditions when additional waste deposits are inserted a twenty minute timer switch is used to close the circuit until the molecular and ionic concentrations build up to reduce the 400,000 Ohm resistence and cause the solid state control itself to activate and contol the motors and primary heater.

When the molecule-ion concentration reaches a state of PMC so that the sensor resistence reaches a 60,000 Ohm value, the solid state control closes the secondary heater circuit until such time as the heat supplied by the secondary heaters 80 is no longer needed to reduce the relative humidity of the transport air. A significantly higher set point may be selected in order to enhance moisture removal.

In the event the sensor resistence reaches a low of 25,000 Ohms, at which value the biological transformation is known to be very low, a third circuit is closed which causes a red warning light 81 to be activated. If this condition is reached no more waste, liquid or solid, should be inserted until the light is automatically turned off when the waste mixture PMC has again returned to a working value between 40 PMC and 60 PMC. In the control arrangement shown in FIG. 8, the heaters 74 and 80 are connected directly in parallel with the stirring mechanism and stop and start via the manual control switch and the moisture sensor. Otherwise the circuit control is substantially the same as disclosed with respect to FIG. 7.

The lid 16 of the cabinet 12, as shown in the embodiment of FIG. 1, is provided with a switch 100 for controlling the motor. Upon opening of the lid 16, all of the circuits will be opened so that the various heater elements, drive motors, and fan motors will be shut off. A similar cabinet 12 and lid 16 may be utilized with the embodiment of FIGS. 4 and 5, and by closing of the lid 16 all of the motors 63, 65, 67, 69, 76, and 78, will be energized along with the first heating coil 74 located on the bottom of the vessel 70. A timer 110 is in the circuit with the switch 100 so that the circuit to the motors and the first heating coils 74 will remaining closed for twenty minutes or any other desired period of time. This will allow the moisture of the waste material deposited in the vessel to penetrate the sensing element of the moisture responsive switch 82 which will then take over the control of the motors and heating elements. If at the end of the twenty minute period there is insufficient moisture in the vessel to close the circuit through the sensor 82 the entire apparatus will shut down. If the moisture level exceeds a pre-determined percentage, the secondary heating element 80 will be energized to heat the air passing over the surface of the mixture within the vessel to assist in reducing the moisture content. When the percentage moisture content returns to the pre-determined level, the secondary heating elements 80 will be disconnected from the circuit. The first heating coils 74 and the various motors will continue to operate until the percentage moisture content drops to a second pre-determined level whereupon all of the motors and heating elements will be disconnected.

The motor designation M in FIG. 7 includes all of the stirring drive motors 63, 65, 67, and 69, as well as the two fan motors 76 and 78. The fan 78 could be eliminated and the fan 76 could be sufficient to move a flow of air across the heating elements 80 and the upper surface of the mixture. It is also possible to remove the control of the fan 76 from the moisture sensing circuit. In such a case the fan 76 would run substantially continuously unless the unit is taken out of service for an extended period of time. The aerating means 50, 52, and 54, as shown in the embodiment of FIG. 3, may be incorporated in the embodiment of FIGS. 4 and 5, in which case the motor 54 would also be included under the designation M in FIG. 7.

The first heating means, namely the coils 74 associated with the bottom of the vessel 70, are also under the control of the thermostat 120, as shown in FIG. 7. Thus, if the temperature in the vicinity of the vessel is sufficiently high, the thermostat will open to cut off the current to the coils 74 while still permitting the stirring motors and fan motors to operate. In practice, the thermostat switch 120 can be located similar to the thermostat switch 36 in the embodiment of FIG. 3. It is also possible to have the thermostat switch mounted directly within the vessel in the vicinity of the percentage moisture content sensor 82.

While the invention has been particularly shown and described with reference to preferred embodiments thereof, it will be obvious to those skilled in the art that the foregoing and other changes in form and detail can be made therein without departing from the spirit and scope of the invention.

What is claimed is:

1. A method for aerobically converting organic waste materials substantially completely into carbon dioxide and water comprising depositing said waste material into a substantially dry bed of a suitable dispersing agent located in a collecting vessel, initiating and continuously stirring the contents of said collecting velssel, placing a moisture sensor in contact with said contents, sensing the percentage moisture content of the contents of said collecting vessel and stopping the stirring upon sensing a decrease in the percentage moisture content when the reaction is complete and the percentage moisture content drops below a predetermined value.

2. A method as set forth in claim 1 further comprising sensing the temperature within said vessel during the stirring of the contents of said vessel, supplying heat to said vessel during stirring to maintain a predetermined temperature and discontinuing the supply of heat upon stopping said stirring.

3. A method as set forth in claim 2 further comprising maintaining an optimum temperature of approximately ninety degrees Farenheit during said stirring.

4. A method as set forth in claim 1 further comprising directing a flow of heated air over the surface of the contents of said vessel when said percentage moisture content increases to a second predetermined value greater than said first mentioned predetermined value.

5. A method as set forth in claim 4 further comprising activating a warning light when said percentage moisture content increases above a third predetermined value greater than said second predetermined value.

* * * * *